United States Patent
Chen

(10) Patent No.: US 7,391,540 B2
(45) Date of Patent: Jun. 24, 2008

(54) SHEET-FED SCANNER CAPABLE OF SWITCHING BACKGROUNDS

(75) Inventor: Chi-Yao Chen, Hsin Chu (TW)

(73) Assignee: Avision Inc. (TW)

( * ) Notice: Subject to any disclaimer, the term of this patent is extended or adjusted under 35 U.S.C. 154(b) by 436 days.

(21) Appl. No.: 11/156,584

(22) Filed: Jun. 21, 2005

(65) Prior Publication Data

US 2006/0001917 A1  Jan. 5, 2006

(30) Foreign Application Priority Data

Jun. 30, 2004  (TW) ............................. 93119354 A

(51) Int. Cl.
*H04N 1/04* (2006.01)
(52) U.S. Cl. ..................... 358/474; 358/461; 358/486; 358/496; 358/498; 358/464; 358/465
(58) Field of Classification Search ................ 358/461, 358/496, 498, 486, 406, 504, 474, 505, 464, 358/465; 382/274; 399/367, 364, 370, 371, 399/374; 355/23
See application file for complete search history.

(56) References Cited

U.S. PATENT DOCUMENTS 6,166,394 A    12/2000  Rubscha
6,323,933 B1 * 11/2001  Anzai ........................... 355/23
7,126,725 B2 * 10/2006  Okutomi et al. ............. 358/474

FOREIGN PATENT DOCUMENTS

JP               01277054 A  * 11/1989

* cited by examiner

*Primary Examiner*—Cheukfan Lee

(57) ABSTRACT

In a sheet-fed scanner capable of switching backgrounds, a scanning module scans a document, which is transported by a sheet-feeding mechanism across a scan region, and a stationary background component, which has a plurality of sections having different reflectivities and is disposed in the scan region. The scanning module includes an image sensor, a lens and at least one reflecting mirror. An actuator actuates the at least one reflecting mirror to enable the image sensor to selectively sense one of the sections of the background component as a scan background for the document through the lens and the at least one reflecting mirror.

13 Claims, 6 Drawing Sheets

SHEET-FED SCANNER CAPABLE OF SWITCHING BACKGROUNDS

BACKGROUND OF THE INVENTION

1. Field of the Invention

The invention relates to a sheet-fed scanner capable of switching backgrounds, and more particularly to a sheet-fed scanner capable of scanning a plurality of sections of a background component having different reflectivities as different backgrounds.

2. Description of the Related Art

In a conventional sheet-fed scanner or a flatbed scanner equipped with a scanning module and an automatic document feeder, the scan background cannot be switched because the background for the scanning module is stationary.

The main object of changing the scan background is to find a leading edge, a side edge and a trailing edge of a sheet. The edge-finding procedure enables the scanner to correct the skewness of the sheet, to start and end the image acquiring procedure at proper time instants, and to determine the scanning width. The typical document is white, so the background should be the dark background to facilitate the edge-finding procedure. However, some special documents (e.g., highlighted documents) are in a dark color, so the background should be in white to facilitate the edge-finding procedure. In a color scan mode, the background for the color document may also depend on the color of the document.

In addition, the color of the background may be configured such that the holes of the punched documents, including black-and-white and color documents, cannot affect the scan result. Furthermore, when the scanner scans a thin document, the background color also tends to affect the scan result. In this case, the background color is preferably close to the background color of the document in order to prevent the scan result from being affected. Consequently, the sheet-fed scanner capable of switching backgrounds can enable various image processing functions to be achieved.

Hence, it is an important object of the invention to provide a sheet-fed scanner capable of switching backgrounds such that background of different colors can be selected.

SUMMARY OF THE INVENTION

It is therefore an object of the invention to provide a sheet-fed scanner capable of switching backgrounds, wherein at least one reflecting mirror of a scanning module is slightly rotated such that a plurality of sections of a background component having different reflectivities is sensed as different scan backgrounds when the scanning module scans a document.

To achieve the above-mentioned object, the invention provides a sheet-fed scanner including a housing, a sheet-feeding mechanism, a first scanning module, a first actuator and a first background component. The sheet-feeding mechanism transports a document across a scan region. The first scanning module, which is fixed in the housing, scans a front side of the document in the scan region. The first scanning module includes a first image sensor, a first lens and at least one first reflecting mirror. The first actuator actuates the at least one first reflecting mirror. The first background component is fixed in the housing and located in the scan region and has a plurality of sections having different reflectivities. The first actuator actuates the at least one first reflecting mirror such that the first image sensor selectively senses one of the sections of the first background component through the first lens and the at least one first reflecting mirror, as a first scan background when the first image sensor senses the front side of the document.

In the above-mentioned sheet-fed scanner, it is possible to utilize the property of a cam, a piezoelectric material or a bimetal material to rotate the reflecting mirror such that the image sensor can selectively sense one of the sections of the background component as a scan background when the document is scanned, wherein the sections have different reflectivities.

DETAILED DESCRIPTION OF THE INVENTION

The embodiments of the invention will be described with reference to the accompanying drawings.

Figure 1:
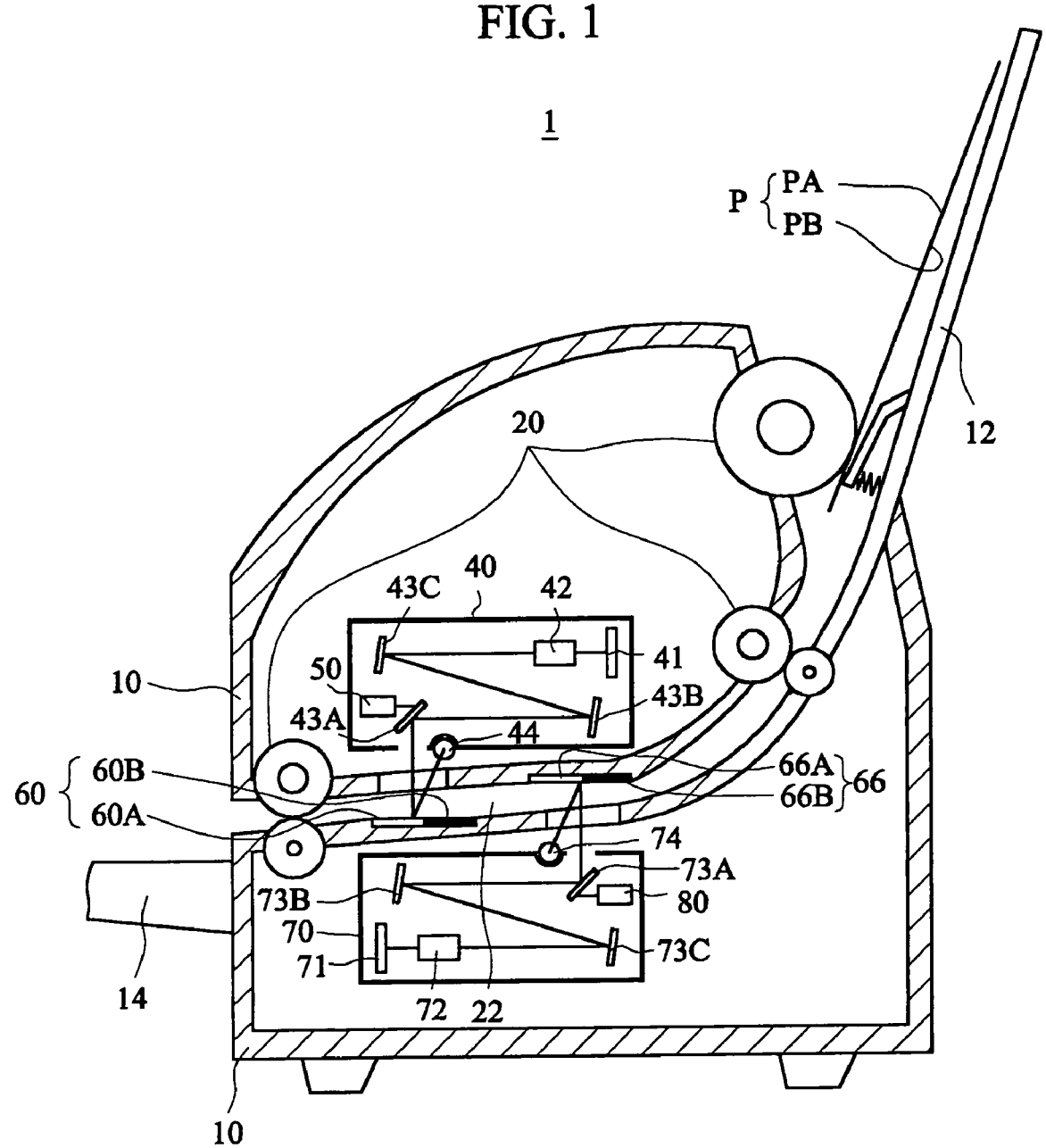
FIG. 1 shows a sheet-fed scanner according to a first embodiment of the invention.
Figure 2:
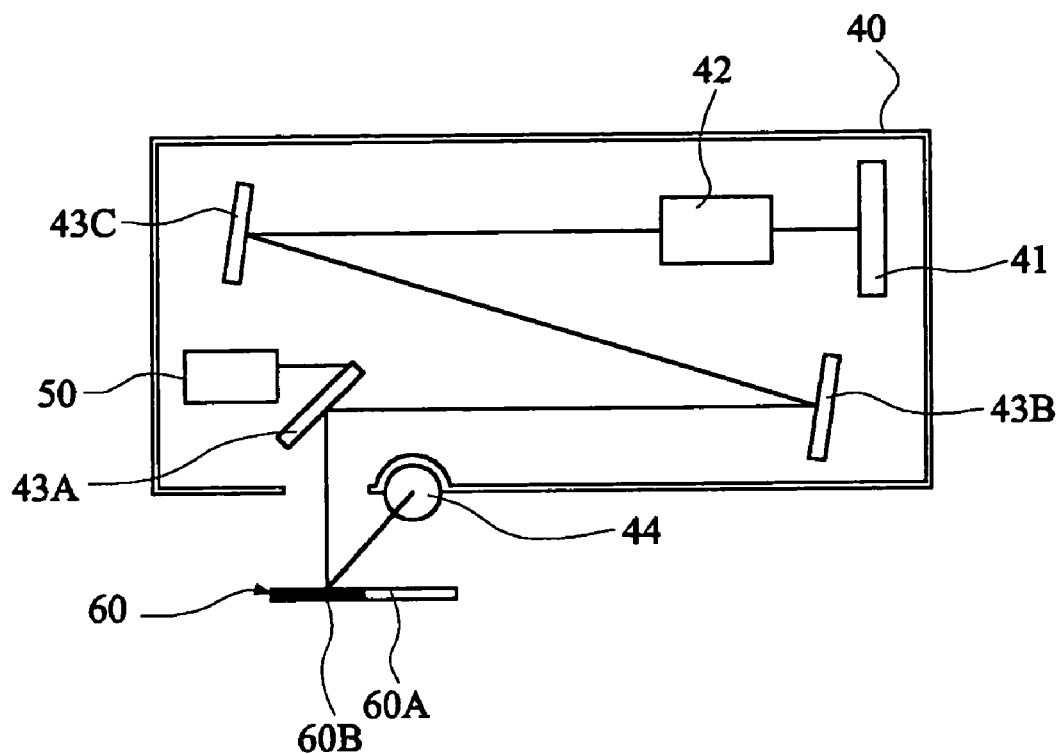
FIG. 2 shows a first state of the scanning module of FIG. 1.
Figure 3:
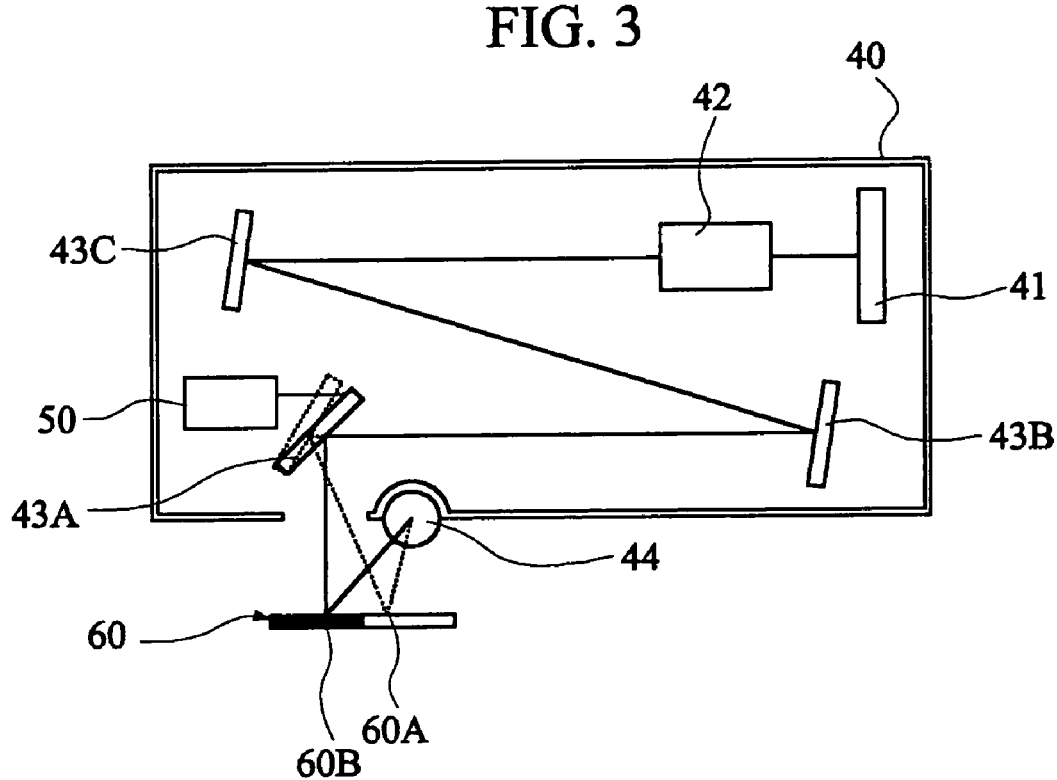
FIG. 3 shows a second state of the scanning module of FIG. 1.

FIG. 1 shows a sheet-fed scanner according to a first embodiment of the invention. FIGS. 2 and 3 respectively show a first state and a second state of the scanning module of FIG. 1. As shown in FIGS. 1 to 3, a sheet-fed scanner 1 of the invention of switching backgrounds is a duplex sheet-fed scanner for scanning a front side and a back side of a document. In fact, the concept of the invention may also be implemented in a simplex sheet-fed scanner.

The sheet-fed scanner 1 includes a housing 10, a sheet-feeding mechanism 20, a first scanning module 40, a first actuator 50 and a first background component 60. The housing 10 has a sheet input tray 12 for supporting a to-be-scanned document P, and a sheet output tray 14 for supporting the document P that is scanned. The sheet-feeding mechanism 20 transports the document P across a scan region 22. The first scanning module 40 is fixed in the housing 10 and scans a front side PA of the document P in the scan region 22. The first scanning module 40 includes a first image sensor 41, a first lens 42, a plurality of first reflecting mirrors 43A and 43C, and a first light source 44 for illuminating the front side PA of the document P and the first background component 60. The first actuator 50 actuates the first reflecting mirror 43A. The first background component 60 is fixed in the housing 10 and located in the scan region 22. A light ray coming from the first background component 60 is reflected subsequently by the first reflecting mirrors 43A, 43B and 43C to the first lens 42 which focuses the light ray onto the first image sensor 41. As the first actuator 50 actuates the first reflecting mirror 43A, the first image sensor 41 selectively senses one of a first section 66A and a second section 66B of the first background component 60 having different reflectivities through the first lens 42 and the first reflecting mirrors 43A to 43C, for obtaining a first scan background when the first image sensor senses the front side PA of the document P. In practice, the number of sections having different reflectivities may be three or more than three, and the different reflectivities may be determined with respect to the white or color light.

In addition, the duplex sheet-fed scanner 1 further includes a second scanning module 70, a second actuator 80 and a second background component 66, which are constructed similarly to the first scanning module 40, the first actuator 50 and the first background component 60. The second scanning module 70, which is fixed in the housing 10 and opposite to the first scanning module 40, scans a back side PB of the document P in the scan region 22. Similar to the first scanning module 40, the second scanning module 70 includes a second image sensor 71, a second lens 72, a plurality of second reflecting mirrors 73A to 73C, and a second light source 74. The second actuator 80 actuates the second reflecting mirror 73A. The second background component 66 is fixed in the housing 10 and located in the scan region 22, and has a first section 66A and a second section 66B having different reflectivities.

As the second actuator 80 actuates the second reflecting mirror 73A, the second image sensor 71 senses the section 66A or 66B of the second background component 66 through the second lens 72 and the second reflecting mirrors 73A to 73C, as a second scan background when the second image sensor 71 senses the back side PB of the document P. Each of the image sensors 41 and 71 may be a charge coupled device (CCD).

In the drawings, the illustrated first background component 60 has a level surface. In other embodiments, however, the first background component 60 may also have a curved surface, which is capable of reducing the difference between the optical paths corresponding to the first section 60A and the second section 60B in FIG. 3 so as to obtain a better calibration effect.

In the above-mentioned embodiment, the effect of the invention may be achieved as long as at least one of the reflecting mirrors is rotated, and the arrangement and number of the reflecting mirrors are not limited to those as shown in the drawings. Because the rotation of the reflecting mirror is very sensitive to the variation of the optical path, a small angle rotation of the reflecting mirror may achieve the effect of the invention. The rotatable reflecting mirror is preferably close to the background component such that the allowable rotation angle of the reflecting mirror may be enlarged to facilitate the implementation. The example of the actuator will be described in the following example.

Figure 4:
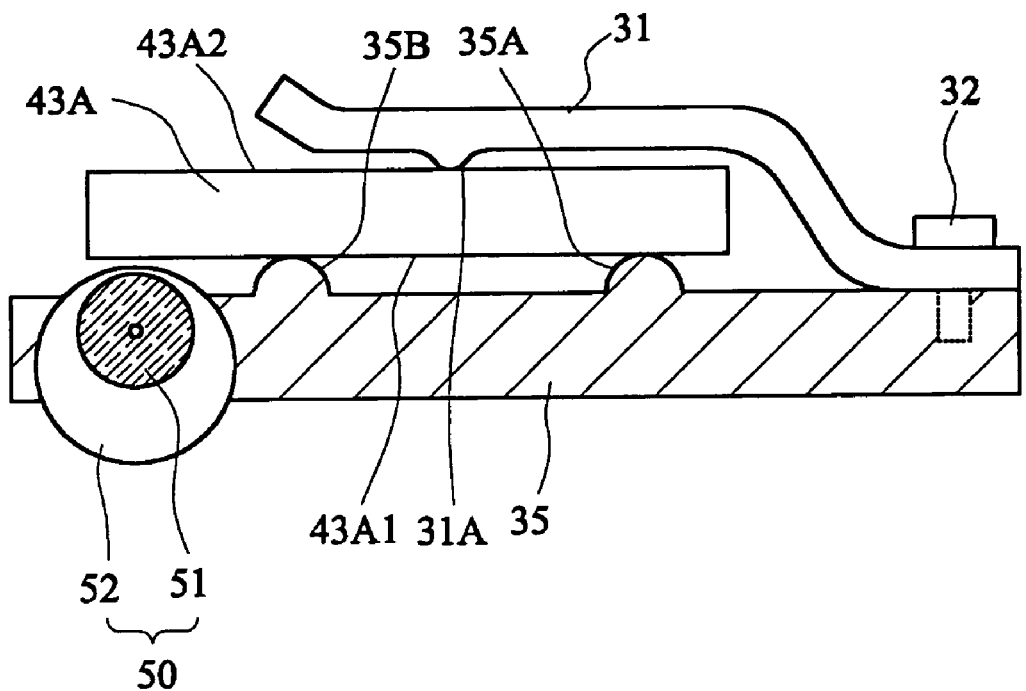
FIG. 4 is a side view showing a first state of a first actuating mechanism corresponding to the reflecting mirror of FIG. 2.
Figure 5:
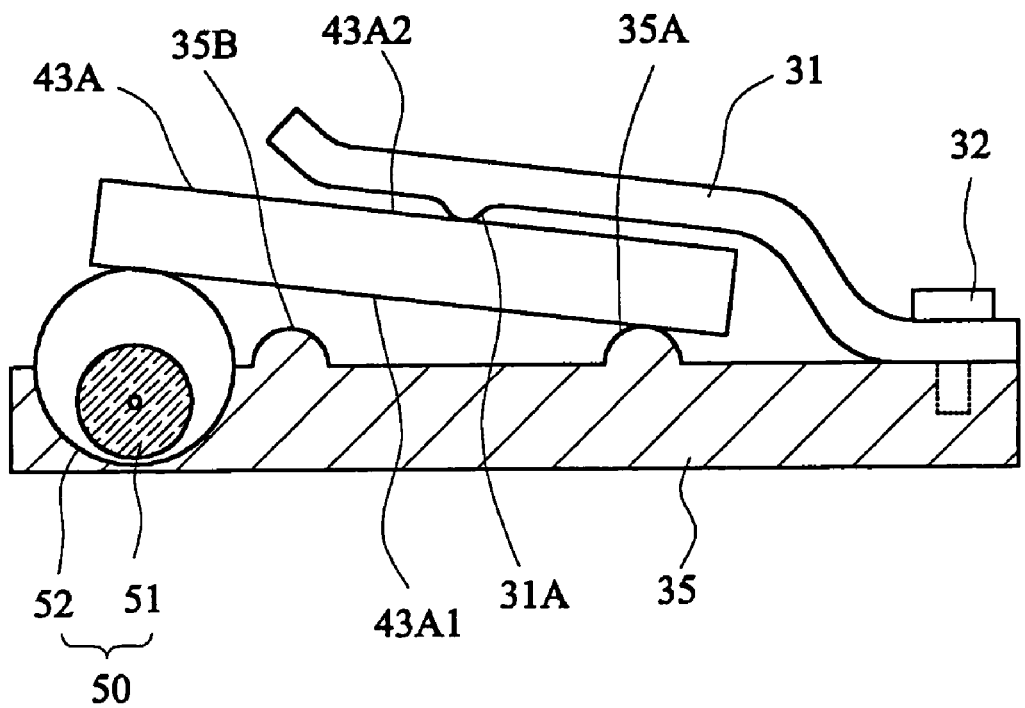
FIG. 5 is a side view showing a second state of the first actuating mechanism corresponding to the reflecting mirror of FIG. 3.
Figure 6:
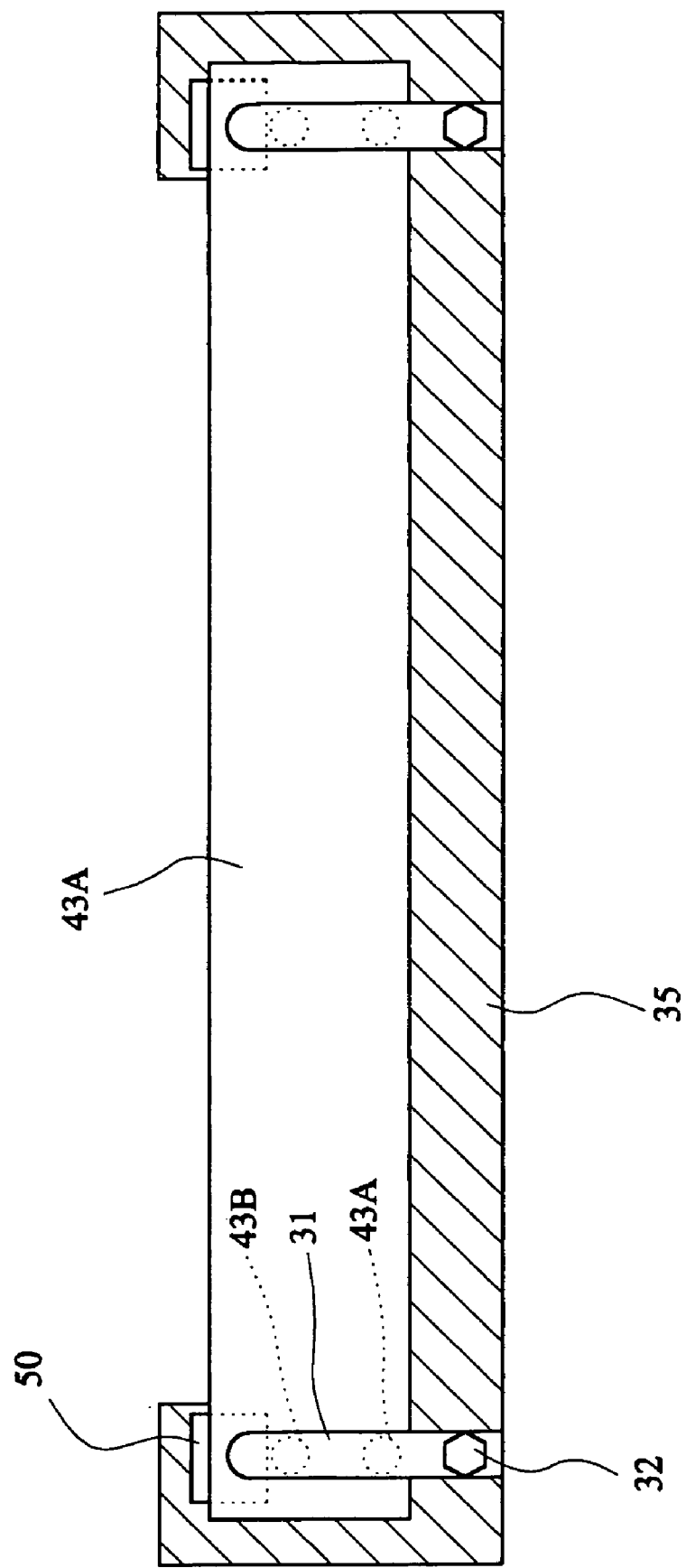
FIG. 6 is a top view showing the first actuating mechanism corresponding to the reflecting mirror of FIG. 4.

FIGS. 4 and 5 are side views respectively showing a first state and a second state of a first actuating mechanism corresponding to the reflecting mirror of FIG. 2, and FIG. 6 is a top view showing the first actuating mechanism corresponding to the reflecting mirror of FIG. 4. As shown in FIGS. 4 to 6, the first actuator 50 includes, for example, a motor 51 and a cam 52, wherein the motor 51 drives the cam 52 to rotate the first reflecting mirror 43A. The first reflecting mirror 43A is placed on a base 35, which may pertain to the housing 10 of the scanner or the housing of the first scanning module 40. The base 35 has two projections 35A and 35B in contact with a lower surface 43A1 of the first reflecting mirror 43A. An elastic member 31 pushes an upper surface 43A2 of the first reflecting mirror 43A toward the base 35. The elastic member 31 is an elastic arm having one end fixed to the base 35 by a bolt 32. The elastic arm has a projection 31A corresponding to a position between the two projections 35A and 35B of the base 35 so as to fix the first reflecting mirror 43A in contact with the projections 35A and 35B. To rotate the first reflecting mirror 43A, the first actuator 50 pushes a side of the first reflecting mirror 43A upwards such that the first reflecting mirror 43A parts from the projection 35B.

It is to be noted that the first actuator 50 is not in contact with the first reflecting mirror 43A before the first actuator 50 rotates the first reflecting mirror 43A, in order to enhance the positioning precision and stability of the first reflecting mirror 43A when the document is being scanned. Therefore, the reference position of the first reflecting mirror 43A, when the first scanning module 40 is scanning the document, depends on the positions of the two projections 35A and 35B of the base 35 and is free from being influenced by the cam 52. Hence, the reference position of the first reflecting mirror 43A may be adjusted to a best position when the scanning module is assembled.

Figure 7:
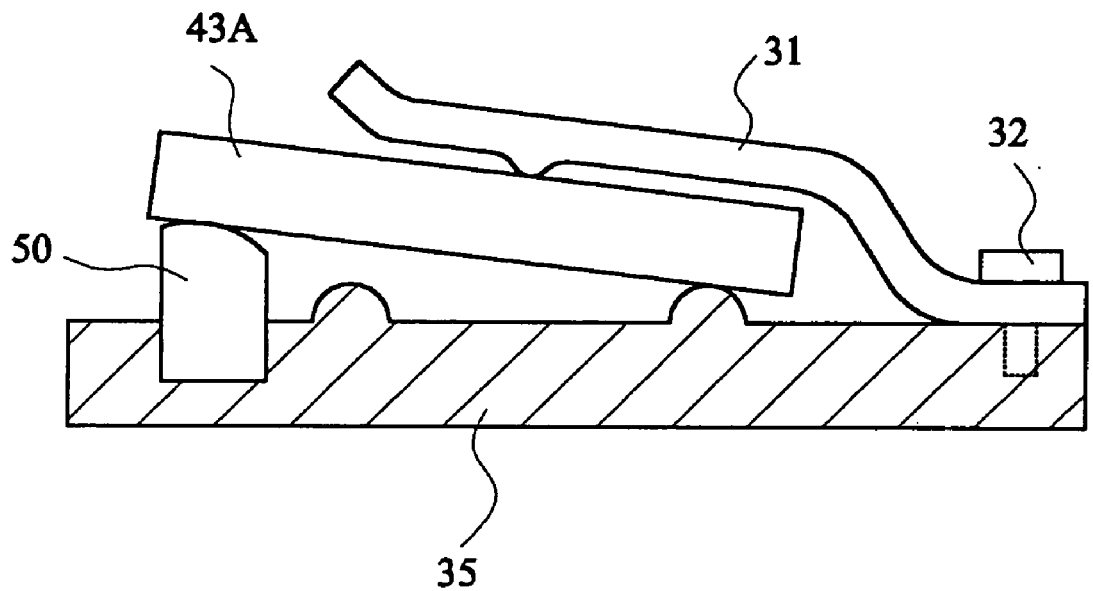
FIG. 7 shows a second actuating mechanism for the reflecting mirror.

FIG. 7 shows a second actuating mechanism for the reflecting mirror. As shown in FIG. 7, the first actuator 50 is made of a piezoelectric material. When a voltage is applied to the piezoelectric material, the piezoelectric material deforms to rotate the first reflecting mirror 43A.

Figure 8:
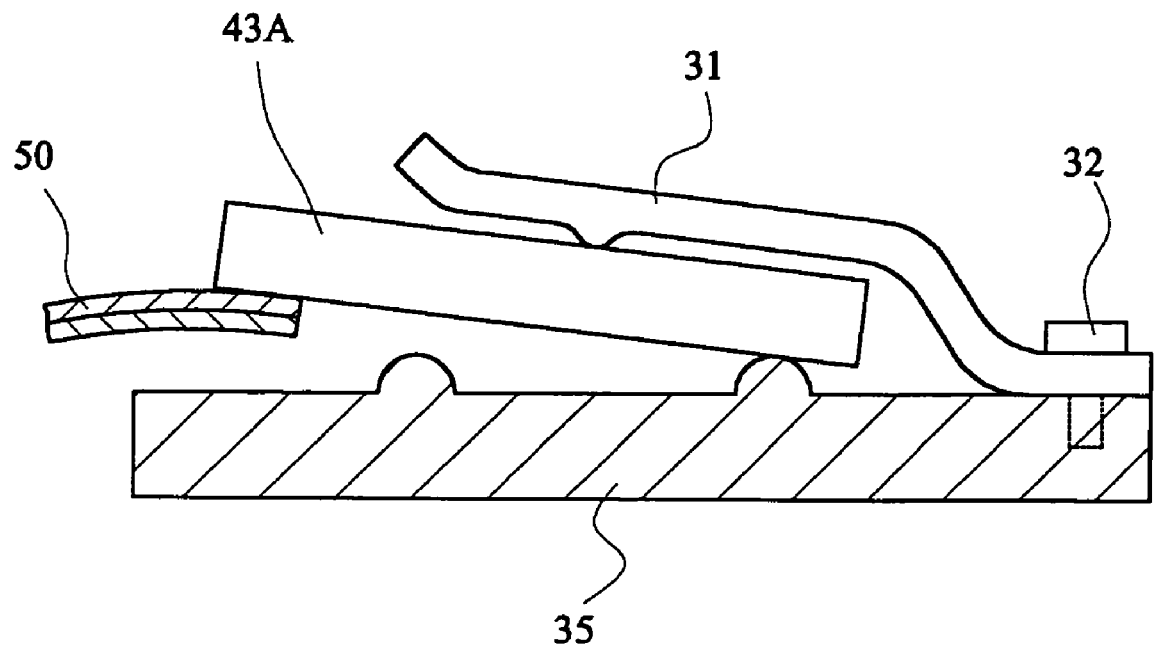
FIG. 8 shows a third actuating mechanism for the reflecting mirror.

FIG. 8 shows a third actuating mechanism for the reflecting mirror. As shown in FIG. 8, the first actuator 50 is made of a bimetal material. When a voltage is applied to the bimetal material, the bimetal material deforms to rotate the first reflecting mirror 43A.

Figure 9:
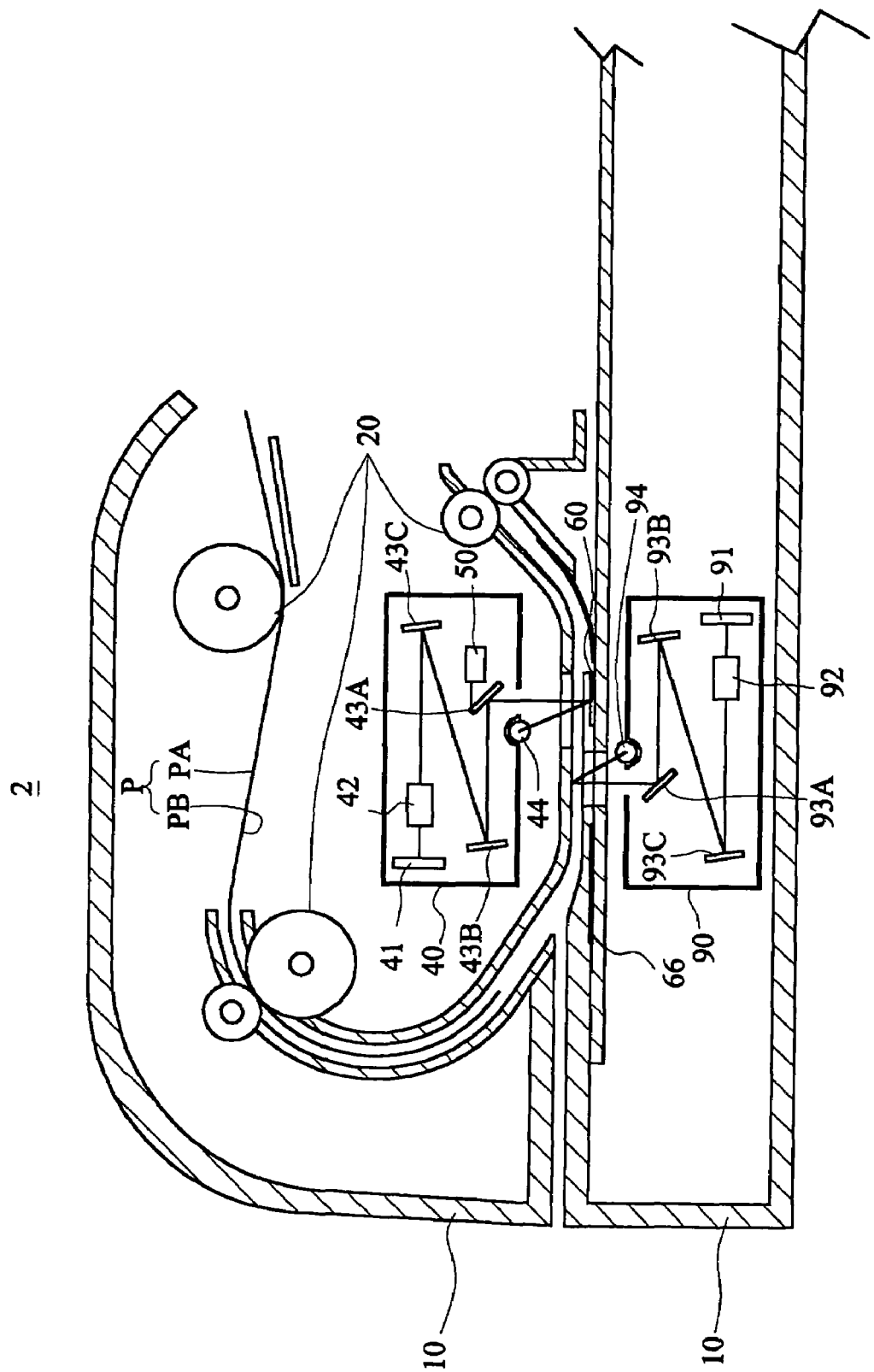
FIG. 9 shows a sheet-fed scanner according to a second embodiment of the invention.

FIG. 9 shows a sheet-fed scanner according to a second embodiment of the invention. As shown in FIG. 9, a sheet-fed scanner 2 of this embodiment is similar to the sheet-fed scanner I of the first embodiment except that a second scanning module 90 of this embodiment is movably mounted in the housing 10 and opposite to the first scanning module 40 so as to provide the functions of flatbed scanning and sheet-fed scanning. Because the second scanning module 90 is movable, one of the plurality of sections having different reflectivities on the second background component 66 may be selectively sensed without the reflecting mirror corresponding to the second scanning module being rotated. When the sheet-fed scanner is scanning, the second scanning module 90 scans the back side PB of the document P. Similarly, the second scanning module 90 includes a second image sensor 91, a second lens 92, a plurality of second reflecting mirrors 93A to 93C, and a second light source 94.

According to the embodiment of the invention, it is possible to implement the sheet-fed scanner capable of switching backgrounds. Using the cam, the piezoelectric material, the bimetal material, and the like can achieve the small angle rotation of the reflecting mirror, and can thus effectively increase the number of sections having different reflectivities when the scanning module is scanning the background component. Thus, the effect of background switching can be obtained, and the above-mentioned image processing procedures, such as the skew correction, the length and width selection, and the background elimination, may be conveniently performed.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A sheet-fed scanner, comprising:
    a housing;
    a sheet-feeding mechanism for transporting a document across a scan region;

a first scanning module, which is fixed in the housing, for scanning a front side of the document in the scan region, wherein the first scanning module comprises a first image sensor, a first lens and at least one first reflecting mirror;

a first actuator for actuating the at least one first reflecting mirror; and a first background component, which is fixed in the housing and located in the scan region and has a plurality of sections having different reflectivities, wherein:

the first actuator actuates the at least one first reflecting mirror such that the first image sensor selectively senses one of the sections of the first background component through the first lens and the at least one first reflecting mirror, as a first scan background when the first image sensor senses the front side of the document; and the at least one first reflecting mirror is placed on a base having two projections in contact with a lower surface of the at least one first reflecting mirror and an elastic member presses against an upper surface of the at least one first reflecting mirror toward the base, such that when the first actuator pushes a side of the at least one first reflecting mirror upwards, the at least one first reflecting mirror parts from one of the projections and the at least one first reflecting mirror is rotated.

2. The sheet-fed scanner according to claim 1, wherein the first background component has a level surface.

3. The sheet-fed scanner according to claim 1, wherein the first background component has a curved surface.

4. The sheet-fed scanner according to claim 1, wherein the first actuator comprises:

a power source; and a cam driven by the power source to rotate the at least one first reflecting mirror.

5. The sheet-fed scanner according to claim 4, wherein the power source is a motor.

6. The sheet-fed scanner according to claim 1, wherein the first actuator is made of a piezoelectric material, and the piezoelectric material deforms to rotate the at least one first reflecting mirror when a voltage is applied to the piezoelectric material.

7. The sheet-fed scanner according to claim 1, wherein the first actuator is made of a bimetal material, and the bimetal material deforms to rotate the at least one first reflecting mirror when a voltage is applied to the bimetal material.

8. The sheet-fed scanner according to claim 1, wherein the first scanning module further comprises a first light source for illuminating the front side of the document and the first background component.

9. The sheet-fed scanner according to claim 1, wherein the elastic member is an elastic arm having one end fixed to the base and one projection corresponding to a position between the two projections of the base.

10. The sheet-fed scanner according to claim 1, wherein the first actuator is not in contact with the at least one first reflecting mirror before the first actuator rotates the at least one first reflecting mirror.

11. The sheet-fed scanner according to claim 1, further comprising:

a second scanning module, which is fixed in the housing and opposite to the first scanning module, for scanning a back side of the document, wherein the second scanning module comprises a second image sensor, a second lens, at least one second reflecting mirror and a second light source;

a second actuator for actuating the at least one second reflecting mirror; and a second background component fixed in the housing and located in the scan region and has a plurality of sections having different reflectivities, wherein the second actuator actuates the at least one second reflecting mirror such that the second image sensor selectively senses one of the sections of the second background component through the second lens and the at least one second reflecting mirror, as a second scan background when the second image sensor senses the back side of the document.

12. The sheet-fed scanner according to claim 1, further comprising:

a second scanning module, which is movably mounted in the housing and opposite to the first scanning module, for scanning a back side of the document in the scan region.

13. The sheet-fed scanner according to claim 12, wherein the second scanning module comprises a second image sensor, a second lens, at least one second reflecting mirror and a second light source.

* * * * *